(12) United States Patent
Nathal et al.

(10) Patent No.: US 6,886,327 B1
(45) Date of Patent: May 3, 2005

(54) NIAL-BASED APPROACH FOR ROCKET COMBUSTION CHAMBERS

(75) Inventors: Michael V. Nathal, Strongsville, OH (US); John Gayda, Avon Lake, OH (US); Ronald D. Noebe, Medina, OH (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 10/627,107

(22) Filed: Jul. 22, 2003

Related U.S. Application Data

(63) Continuation-in-part of application No. 10/105,110, filed on Mar. 20, 2002, now abandoned.

(51) Int. Cl.[7] .............................. B32B 15/01; F02K 9/68
(52) U.S. Cl. ...................... 60/200.1; 428/680; 428/679; 60/752
(58) Field of Search ................................ 428/679, 680, 428/678, 686, 675, 668; 60/200.1, 766, 721, 39.01, 752; 431/356

(56) References Cited

U.S. PATENT DOCUMENTS

| | | | |
|---|---|---|---|
| 3,625,750 A | 12/1971 | Baranow et al. ...... 117/107.2 P |
| 3,653,976 A | * 4/1972 | Miller et al. ................. 136/231 |
| 4,610,736 A | 9/1986 | Barrett et al. ................ 148/429 |
| 5,023,050 A | 6/1991 | McKannan et al. .......... 420/448 |
| 5,069,179 A | 12/1991 | Kramer et al. ............... 123/270 |
| 5,161,898 A | 11/1992 | Drake .......................... 384/95 |
| 5,222,282 A | * 6/1993 | Sukonnik et al. ............. 29/17.9 |
| 5,348,446 A | * 9/1994 | Lee et al. ................ 416/241 R |
| 5,516,380 A | 5/1996 | Darolia et al. ............... 148/404 |
| 5,626,462 A | 5/1997 | Jackson et al. .......... 416/241 R |
| 5,705,280 A | 1/1998 | Doty ........................ 428/539.5 |
| 5,725,691 A | 3/1998 | Liu ............................... 148/409 |
| 5,749,229 A | 5/1998 | Abuaf et al. ................... 60/752 |
| 5,820,337 A | * 10/1998 | Jackson et al. .............. 415/200 |
| 5,843,585 A | 12/1998 | Alperine et al. ............. 428/623 |
| 5,960,632 A | 10/1999 | Abuaf et al. ................... 60/752 |
| 5,965,274 A | 10/1999 | Deevi et al. .............. 428/472.2 |
| 5,975,852 A | 11/1999 | Nagaraj et al. .......... 416/241 R |
| 6,153,313 A | 11/2000 | Rigney et al. ............... 428/632 |
| 6,218,029 B1 | 4/2001 | Rickerby ..................... 428/615 |
| 6,228,510 B1 | 5/2001 | Chen et al. .................. 428/615 |
| 6,444,061 B1 | * 9/2002 | Hirano et al. ................ 148/556 |
| 2002/0031603 A1 | * 3/2002 | Miyamoto et al. ........... 427/191 |

OTHER PUBLICATIONS

Japanese Publication 1966JP–0067422 (with translation).
Japanese Publication 09–157866.

* cited by examiner

*Primary Examiner*—John J. Zimmerman
(74) *Attorney, Agent, or Firm*—Kent N. Stone

(57) ABSTRACT

A multi-layered component, such as a rocket engine combustion chamber, includes NiAl or NiAl-based alloy as a structural layer on the "hot" side of the component. A second structural layer is formed of material selected from Ni-based superalloys, Co-based alloys, Fe-based alloys, Cu, and Cu-based alloys. The second material is more ductile than the NiAl and imparts increased toughness to the component. The second material is selected to enhance one or more predetermined physical properties of the component. Additional structural layers may be included with the additional material(s) being selected for their impact on physical properties of the component.

16 Claims, 1 Drawing Sheet

"HOT"

"HOT"

"HOT"

NIAL-BASED APPROACH FOR ROCKET COMBUSTION CHAMBERS

This application is a continuation-in-part of application Ser. No. 10/105,110 filed Mar. 20, 2002, now abandoned.

ORIGIN OF THE INVENTION

The invention described herein was made by employees of the United States Government and may be manufactured and used by or for the Government for Government purposes without the payment of any royalties thereon or therefor.

BACKGROUND OF THE INVENTION

A. Field of Invention

This invention pertains to the art of methods and apparatuses for providing components for use in hostile thermal environments. More particularly, the invention is directed to high heat flux devices having two or more structural layers.

B. Description of the Related Art

Current combustion chambers and related devices used in hydrogen-oxygen fueled rockets, or advanced air breathing "combined cycle" designs are placed in very high heat flux environments. As such, they are usually made out of copper alloys to take advantage of copper's high thermal conductivity, or from nickel-base superalloys, to take advantage of their high temperature strength. For a given component, choice of the preferred material (copper or superalloy) depends on the actual heat flux environment and the trade-off between strength and conductivity. Copper alloys have very high conductivity (300 W/mK) but only moderate strength and are limited by oxidation attack to temperatures of about 1200° F. Superalloys have the strength and oxidation resistance to reach as high as 2200° F., but have low conductivity, (10 W/mK). NiAl has oxidation resistance up to 2400° F. and is stronger than many superalloys, especially wrought alloys, above 1900° F. It has thermal conductivity value of about 70 W/mK, lower than copper but seven times better than superalloys.

NiAl is an intermetallic compound that has been studied for potential turbine engine applications for many years. One extensively used form of NiAl is as a thin coating (less than 5% of the total part thickness) for superalloy turbine blades. As a coating, NiAl is not a structural (load-bearing) component, but is applied to provide resistance to oxidation and corrosion attack.

Additionally, NiAl has been examined as a structural material. It is known in the art to employ alloys as structural parts in jet engines. The benefits of NiAl in general and these alloys specifically are their lighter weight, higher melting point, good environmental resistance, and high thermal conductivity (relative to superalloys, not copper). However, NiAl alloys are not currently used in structural applications in actual engines because they are excessively brittle and are not damage tolerant. U.S. Pat. No. 5,516,380 discusses the low ductility of binary NiAl intermetallics that impedes the implementation of NiAl intermetallics as a viable substitute for nickel-base superalloys.

U.S. Pat. No. 5,725,691 discloses alloys for use in structural applications based on NiAl. Selected elements are added to the alloy to enhance room temperature ductility and high temperature strength.

Bimetallic structures have also been widely identified for engineering applications. The bimetallic concept is different from a coating in that the thickness of the two metallic components may each approach 50% of the total part thickness, rather than one component being confined to a thin coating layer. For example, many electronic sensors and switches are bimetallic components. Bimetallic concepts in jet engines have been considered in the past, but the time/temperature combinations typical of commercial jet aircraft engines are such that the bimetallic structures may degrade due to interdiffusion.

U.S. Pat. No. 5,975,852 discloses a thermal barrier coating and a method for forming the coating on an article designed for use in a hostile thermal environment. This patent discusses the use of a NiAl substrate to which a thermal barrier coating is applied. Alternately, the patent discloses that the substrate may be formed of a superalloy on which the NiAl alloy is provided as a monolithic surface layer having a thickness of at least 125 micrometers. However, each of the disclosed applications includes a ceramic layer covering a layer of aluminum oxide.

U.S. Pat. No. 5,161,898 discloses a roller cutter drill bit having bearing elements formed of a superalloy material. The bearing surfaces of the bearing elements have an aluminide coating to purportedly accommodate applications with temperatures up to and above 500° F. and thermal load spikes of 1000° F. The disclosed aluminide coating comprises a thickness of preferably around 0.005 inch on a component having a total thickness of 0.050 inch.

Japanese Publication 09-157866 discloses a corrosion resistant and oxidation resistant coating film for application onto a substrate base material. The disclosed film includes a single phase NiAl layer applied either directly to the substrate or onto an intermediate CoNiCrAlY layer. The disclosed coatings ranged in thickness from 0.10 mm (0.004 inch) to 0.30 mm (0.012 inch) (Table 1).

U.S. Pat. No. 3,625,750 discloses a method for producing aluminum intermetallic coatings on articles consisting of nickel- or cobalt-based alloys. An exemplary coating ranges from 1.75 mils (0.00175 inch) to 3.5 mils (0.0035 inch) on the surface of a turbine blade.

U.S. Pat. No. 5,348,446 discloses an airfoil for a gas turbine engine. The conventional airfoil profile is constructed from a core body formed of a conventional nickel-based superalloy. Leading and trailing edge components and a squealer tip formed of a nickel aluminide alloy are bonded to the core body.

Japanese Publication 19661P-0067422 discloses a molybdenum or molybdenum alloy substrate having a multi-layered coating of chrome and nickel or nickel alloy and alumina. However, the molybdenum or molybdenum alloy is not innately resistant to oxidation at elevated temperatures. The coating serves as a necessary barrier to oxidation and serves no structural function.

U.S. Pat. No. 5,965,274 discloses an electronic circuit component comprising a NiAl and/or $Ni_3Al$ substrate upon which an alumina layer is formed prior to applying the conductive elements. The thermal conductivity of the electronic component may be enhanced by roll-bonding or joining a metal such as copper or copper-aluminum alloy to the substrate. The reference does not provide that the copper or copper-aluminum alloy forms a structural layer of the electronic component. Further, the reference does not provide for applications that involve exposure to hostile thermal environments.

U.S. Pat. No. 5,626,462 discloses an airfoil for use at high temperatures. The airfoil has a double-wall construction. The airfoil includes an airfoil support wall and an airfoil skin. A series of internal channels are formed within the double-wall airfoil structure between the airfoil support wall and the airfoil skin.

There remains a need in the art to provide components for use in high temperature applications having improved physical properties and environmental resistance. None of the available art provides a bimetallic or multi-layered structural component for use in high heat flux and hostile thermal environments where each layer is structural, i.e. load-bearing, comprising at least about 20% of the structural thickness. The present invention is directed to utilization of NiAl or NiAl-based alloy as a structural layer in a bimetallic or multi-layered component for use in hostile thermal environments in order to provide advantages over structural components known in the prior art.

SUMMARY OF THE INVENTION

According to one aspect of the present invention, there is provided a new and improved component for use in hostile thermal environments.

According to another aspect of the invention, there is provided a rocket engine component comprising a body having first and second structural layers. Each of the structural layers comprises at least about 20% of a body thickness. The first structural layer is formed of a first material selected from the group consisting of NiAl and NiAl-based alloys, wherein the first material has a first predetermined ductility and a predetermined thermal conductivity. The second structural layer is formed of a second material selected from the group consisting of Ni-based superalloys, Co-based alloys, Fe-based alloys, Cu, and Cu-based alloys, wherein the second material is more ductile than the first material.

According to another aspect of the invention, the predetermined thermal conductivity of the first structural layer is at least about 40 W/mK.

According to another aspect of the invention, the first structural layer has a thickness of at least about 20 mils.

According to another aspect of the invention, the first material is a NiAl-based alloy having elemental additions of Zr at a level of up to approximately 0.3 atomic % of the first material.

According to another aspect of the invention, the first material is a NiAl-based alloy being selected to enhance a predetermined property such as environmental resistance, thermal conductivity and high temperature strength.

According to another aspect of the invention, the component is a combustion chamber, a throat, or a nozzle.

According to another aspect of the invention, there is provided a component for use and exposure within high heat flux and hot gas environments. The inventive component comprises a body including first and second structural layers each at least about 20 mils thick and comprising at least about 20% of a body thickness, wherein the first and second structural layers having continuous adjoining surfaces. The first structural layer includes a surface adapted for direct exposure to the hot gas. The first structural layer is formed of a first material selected from the group consisting of NiAl and NiAl-based alloys. Further, the first material is associated with a first predetermined ductility and a predetermined thermal conductivity. The second structural layer is formed of a second material selected from the group consisting of Ni-based superalloys, Co-based superalloys, Fe-based superalloys, Cu, and Cu alloys. The second structural layer is generally shielded from direct exposure to the hot gas by the first structural layer. Further, the second material is associated with a second predetermined ductility, wherein the second material is more ductile than the first material.

According to another aspect of the invention, the first material is associated with a first coefficient of thermal conductivity and the second material is associated with a second coefficient of thermal conductivity. The second coefficient of thermal conductivity is less than the first coefficient of thermal conductivity.

According to another aspect of the invention, the second material is selected in order to enhance a predetermined property of the component such as environmental resistance, strength, thermal conductivity, ductility, and toughness.

According to another aspect of the invention, the inventive component further comprises a third structural layer comprising at least about 20% of the body thickness, the third structural layer formed of a third material selected to enhance a predetermined property of the component such as environmental resistance, strength, thermal conductivity, ductility, and toughness.

According to another aspect of the invention, the first material is a NiAl-based alloy comprising at least about 95 volume % of a B2-ordered phase.

One advantage of this invention is that the lighter weight, heat resistance, environmental resistance and high thermal conductivity properties of NiAl may be utilized on the "hot" side of structural components.

Another advantage of this invention is that the concept of structural layers improves the damage tolerance of the component that is subjected to the hostile thermal environment.

Another advantage of this invention is that multiple layers can be used with the material forming each layer being selected to impart improved physical properties to the component.

The use of NiAl or NiAl-based alloys provides advantages over copper alloys in terms of weight, temperature capability, and environmental resistance.

NiAl or NiAl-based alloys provide advantages over Ni-based superalloys in terms of weight, temperature capability, and environmental resistance as well as its higher thermal conductivity.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
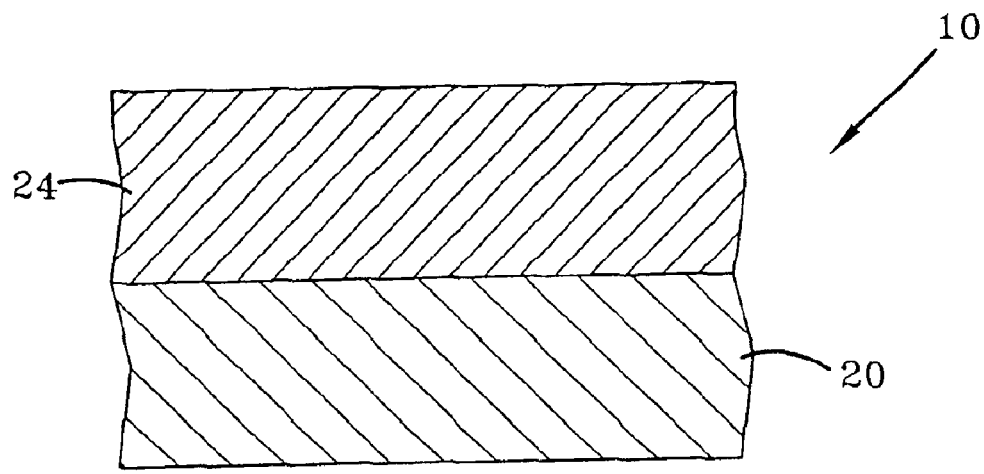
FIG. 1 is a partial cross-sectional view through a portion of a wall of a first embodiment of an exemplary rocket combustion engine; and, FIG. 2 is a partial cross-sectional view through a portion of a wall of another embodiment of an exemplary rocket combustion engine.

Referring now to the drawings wherein the showings are for purposes of illustrating a preferred embodiment of the invention only and not for purposes of limiting the same, FIG. 1 shows an exemplary rocket engine component 10. In a preferred embodiment, the component 10 can be, for example, the combustion chamber, throat and/or nozzle of a rocket engine.

Although the present invention is described with particular reference to a rocket engine component, the invention may be readily adapted to other components subjected to hostile thermal environments and high heat flux without departing from the spirit and scope of the invention.

The component 10 includes an internal "hot side" which undergoes direct exposure to combustion gases such as hydrogen and oxygen. In the preferred embodiment, the body of component 10 is formed from two or more structural layers. The first structural layer 20 is adapted for exposure on the "hot side" of the component 10. In the present invention, the first structural layer 20 is formed of a first material selected from the list including NiAl and NiAl-based alloys.

As used in this specification, the term "structural layer" is to be differentiated from "coatings" or "barrier layers" applied to a structural substrate. "Coatings" or "barrier layers" usually comprise up to 5% of the total part thickness and are carried on the surface of the load-bearing substrate. In the present invention, each inventive "structural layer" is load-bearing and contributes substantially to the overall integrity of the component.

In the present invention a structural component is a bimetallic or multi-layered load-bearing component. More particularly, the inventive component 10 comprises a body having two or more "structural layers" wherein each structural layer comprises a minimum of about 20% of a part thickness as measured from the hot gas side to the opposite side of the component 10. For relatively "thin" components, each structural layer has a preferred minimum thickness of about 20 mils (0.020 inch).

In the preferred embodiment, the first material is NiAl or a NiAl-based alloy chosen for good environmental resistance, good thermal conductivity, and good strength that persists to high temperatures. In a preferred embodiment, the first material is NiAl or NiAl-based alloy being essentially single phase consisting of at least about 95 volume % of a B2-ordered compound with a thermal conductivity of at least about 40 w/m.

The most preferred embodiment is a NiAl-based alloy having elemental additions of Zr in amounts up to 0.3 atomic %, although other NiAl-based alloys may be chosen using sound engineering principles.

The component 10 of the present invention further includes a second structural layer 24. The second structural layer 24 is formed of a second material that is chosen for the physical properties it imparts to the component 10. In the preferred embodiment, the second material is more ductile than the first material. Although structures made with NiAl or NiAl-based alloys can be brittle at high temperatures, backing the first structural layer 20 with a more ductile second structural layer 24 imparts improved toughness or resistance to brittle fracture of the component 10. The low ductility of the first material is compensated for by the use of the second structural layer 24.

In the preferred embodiment, the second material is selected from the group comprising Ni-based superalloys, Co-base alloys, Fe-based alloys, Cu, and Cu-based alloys, with Ni-based superalloys being the most preferred. Cu or Cu-based alloys could be selected for the second material if enhanced thermal conductivity is also desired. It is preferred that the second material be selected for strength and toughness at levels necessary to constrain catastrophic failure of the first layer 20.

In the preferred embodiment, the second material has a ductility of greater than 5% elongation to constrain catastrophic failure of the first structural layer. Also in the preferred embodiment, the second material has an innate environmental resistance sufficient to survive partial delamination or cracking of the first structural layer.

In the preferred embodiments, the subsequent layers are bonded to each other by means known by those having skill in the art.

Figure 2:
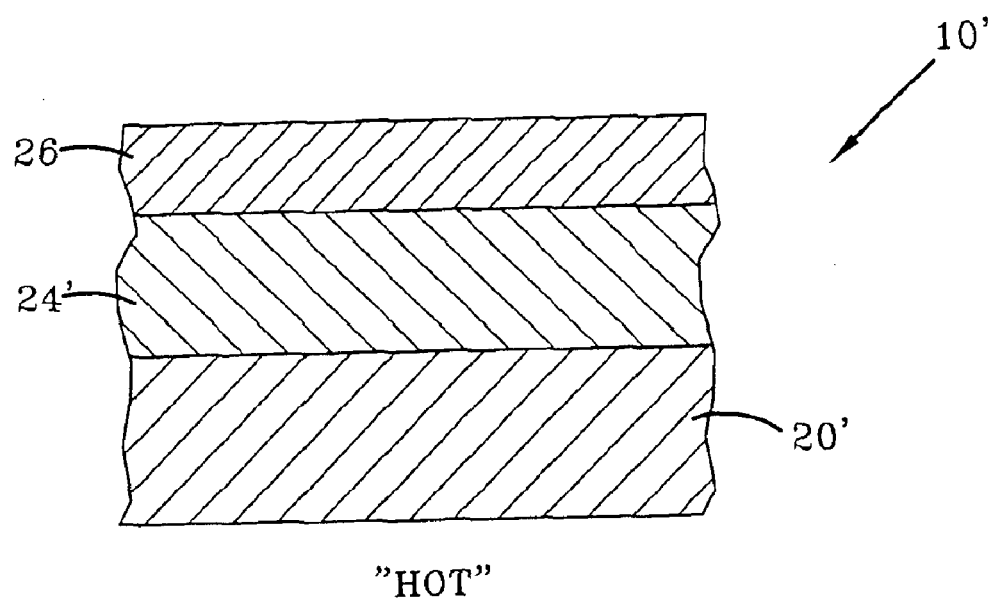

In another preferred embodiment, illustrated in FIG. 2, the component 10' includes a body 12' including first structural layer 20' formed from NiAl or NiAl-based alloy on the "hot side." In addition, the body 12' includes a second structural layer 24', and one or more additional structural layers 26. Each layer 20', 24', 26 is formed of material selected for the particular physical property or properties it imparts to the final component 10'. The physical properties that may be enhanced include environmental resistance, high temperature strength, thermal conductivity, ductility and toughness.

The preferred embodiments have been described herein above. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed.

We claim:

1. A combustion chamber for use in a rocket engine, the combustion chamber comprising:

a substantially enclosed, hollow body having a rocket propellant inlet for receiving associated rocket propellant and an exhaust outlet for releasing exhaust, wherein the walls of the body are constructed of at least first and second structural layers, each comprising at least about 20% of the thickness of the walls of the body, said first structural layer being an interior structural liner layer of the body, having a thickness of at least about 20 mils and being formed of a first material selected from the group consisting of NiAl and NiAl-based alloys, and wherein said first material has a first predetermined ductility and a thermal conductivity of at least about 40 W/mK, and said second structural layer being formed of a second material selected from the group consisting of Ni-based superalloys, Co-based alloys, Fe-based alloys, Cu, and Cu-based alloys, wherein said second material is more ductile than said first material.

2. The combustion chamber of claim 1 wherein said first material is a NiAl-based alloy having elemental additions of Zr.

3. The combustion chamber of claim 2 wherein said elemental additions of Zr are at a level of up to approximately 0.3 atomic % of the first material.

4. The combustion chamber of claim 1 wherein said first material is a NiAl-based alloy being selected to enhance a predetermined property of the combustion chamber selected from the group consisting of environmental resistance, thermal conductivity and high temperature strength.

5. A combustion chamber for use in an associated rocket engine, the combustion chamber comprising:

a substantially enclosed, hollow body wherein the walls of the body are constructed of at least first and second structural layers each at least about 20 mils thick and comprising at least about 20% of the thickness of the walls of the body, said first and second structural layers having continuous adjoining surfaces;

said first structural layer having a surface adapted for direct exposure to a heat source or a hot gas, said first structural layer being formed of a first material selected from the group consisting of NiAl and NiAl-based alloys, and wherein said first material is associated with a first predetermined ductility and a thermal conductivity of at least about 40 W/mK; and said second structural layer being formed of a second material selected from the group consisting of Ni-based superalloys, Co-based superalloys, Fe-based superalloys, Cu, and Cu alloys, said second structural layer being generally shielded from direct exposure to said hot gas by said first structural layer, said second material being associated with a second predetermined ductility, wherein said second material is more ductile than said first material.

6. The combustion chamber of claim 5 wherein said first material is associated with a first coefficient of thermal conductivity and said second material is associated with a second coefficient of thermal conductivity and wherein said second coefficient of thermal conductivity is less than said first coefficient of thermal conductivity.

7. The combustion chamber of claim 5 wherein said second material is selected in order to enhance a predetermined property of the combustion chamber, said predetermined property being selected from the group consisting of environmental resistance, strength, thermal conductivity, ductility, and toughness.

8. The combustion chamber of claim 7, wherein said predetermined property is environmental resistance.

9. The combustion chamber of claim 7 wherein said predetermined property is strength.

10. The combustion chamber of claim 7 wherein said predetermined property is thermal conductivity.

11. The combustion chamber of claim 7 wherein said predetermined property is toughness.

12. The combustion chamber of claim 5 further comprising a third structural layer comprising at least about 20% of said body thickness, said third structural layer formed of a third material selected to enhance a predetermined property of said combustion chamber, said predetermined property being selected from the group consisting of environmental resistance, strength, thermal conductivity, ductility, and toughness.

13. The combustion chamber of claim 5 wherein said first material is a NiAl-based alloy having additions of the element Zr.

14. The combustion chamber of claim 13 wherein said Zr additions are at a level of up to approximately 0.3 atomic % of the first material.

15. The combustion chamber of claim 5 wherein said first material comprises a NiAl-based alloy comprising at least about 95% volume percent of a B2-ordered compound phase.

16. An engine assembly for use in a rocket, the assembly comprising:

a substantially enclosed, hollow combustion chamber having a propellant inlet for receiving propellant and an exhaust outlet for releasing exhaust, wherein the walls of the combustion chamber are constructed of at least first and second structural layers, each comprising at least about 20% of the thickness of the walls of the combustion chamber, the first structural layer being an interior structural liner layer of the combustion chamber, having a thickness of at least about 20 mils and being formed of a first material selected from the group consisting of NiAl and NiAl-based alloys, and wherein the first material has a first predetermined ductility and a thermal conductivity of at least about 40 W/mK, and the second structural layer being formed of a second material selected from the group consisting of Ni-based superalloys, Co-based alloys, Fe-based alloys, Cu, and Cu-based alloys, wherein the second material is more ductile than the first material, and, a nozzle extending from the exhaust outlet of the combustion chamber, wherein the walls of the nozzle are constructed of at least first and second structural layers each comprising at least about 20% of the thickness of the walls of the nozzle, the first structural layer of the nozzle being an interior structural liner layer of the nozzle, having a thickness of at least about 20 mils and being formed of the first material, and wherein the first material has a first predetermined ductility and a thermal conductivity of at least about 40 W/mK, and the second structural layer of the nozzle being formed of the second material selected from the group consisting of Ni-based superalloys, Co-based alloys, Fe-based alloys, Cu, and Cu-based alloys, wherein the second material is more ductile than the first material.

* * * * *